Jan. 7, 1964   O. T. McILVAINE   3,116,982
HUMIDITY RESPONSIVE DRYING APPARATUS
Filed May 19, 1959   3 Sheets-Sheet 1

INVENTOR
ORAN T. McILVAINE

Jan. 7, 1964     O. T. McILVAINE     3,116,982
HUMIDITY RESPONSIVE DRYING APPARATUS
Filed May 19, 1959     3 Sheets-Sheet 2
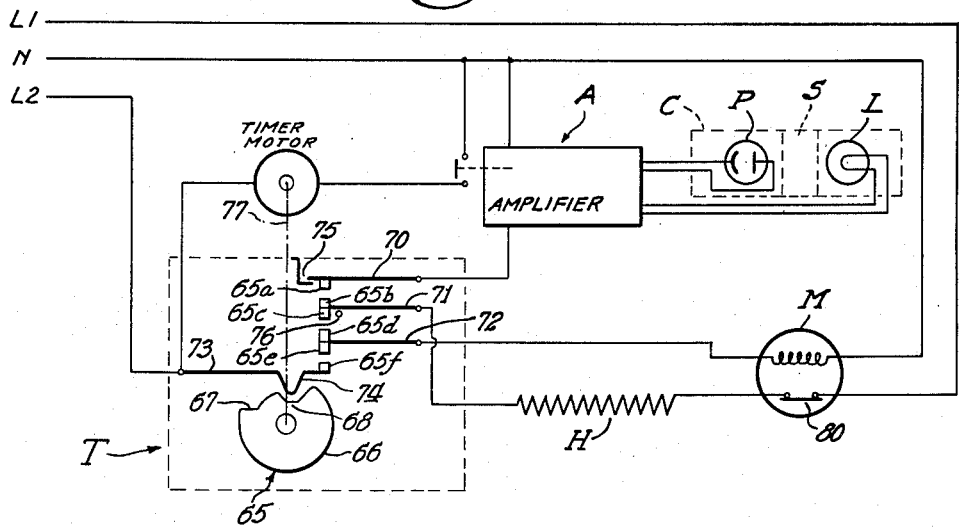
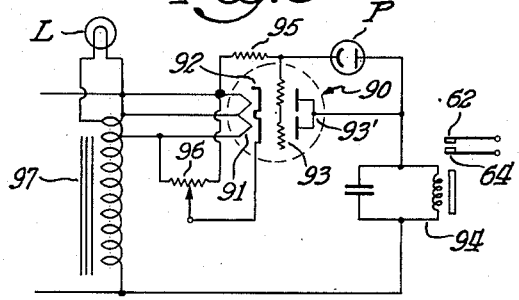
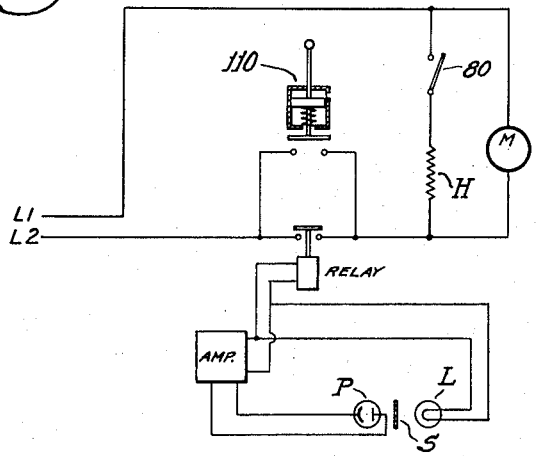
INVENTOR
ORAN T. McILVAINE,
ATTORNEYS Jan. 7, 1964  O. T. McILVAINE  3,116,982
HUMIDITY RESPONSIVE DRYING APPARATUS
Filed May 19, 1959  3 Sheets-Sheet 3

INVENTOR
ORAN T. McILVAINE,

BY [signature]

ATTORNEYS

United States Patent Office 3,116,982
Patented Jan. 7, 1964

3,116,982
HUMIDITY RESPONSIVE DRYING APPARATUS
Oran T. McIlvaine, St. Charles, Ill., assignor to Energy Kontrols, Inc., a corporation of Illinois
Filed May 19, 1959, Ser. No. 814,315
6 Claims. (Cl. 34—45)

The present invention relates to apparatus for sensing humidity conditions, and to systems controlled by the sensing apparatus.

More particularly, the invention relates to humidity sensing apparatus utilizing a material changeable in color or light transmissibility in response to variations in humidity to cause changes in the intensity of the light tranmitted to a photo-cell or other light responsive device.

The humidity sensing apparatus disclosed herein may be used in any system where it is desired to sense the humidity conditions of a gaseous medium such as, for example, heating and air conditioning systems, drying systems, refrigerators, and the like. For a specific application, the present specification includes a disclosure of the use of the humidity sensing apparatus to control the operation of a domestic clothes dryer.

As applied to a domestic clothes dryer, for example, the sensing unit provides a very accurate control of the dryness of the clothes and eliminates the guess work involved when the dryer is controlled by a timer only. The present control is also much more sensitive than proposed thermostatic controls for shutting off a dryer, and consequently, does not cause overdrying of the clothes.

When applied to a dryer, the present sensing unit comprises a photo-cell arrangement in the dryer exhaust, having a chemically treated material, capable of changing color with different amounts of moisture, placed in responsive relation to the light source and photo-cell. The photo-cell is placed in the clothes dryer control circuit to provide an automatic termination of the drying cycle when the moisture content of the exhausted air reaches a predetermined low point.

It is, therefore, an object of the present invention to provide a new and improved moisture sensing unit for general applications.

It is a further object of the invention to provide a new and improved clothes dryer control which is automatic in operation and, if desired, being dependent only on the moisture content of the clothes and not on time or temperature. However, in the case of a clothes dryer, it is advantageous and desirable to have the detector react to temperature as well as humidity. This gives a very exact shutoff point because of the fact, that as the clothes reach the dry point, the temperature starts to rise and this in turn accelerates the shutoff. This makes a very reliable and foolproof control. It is only necessary to choose the proper chemical with which to impregnate the paper to obtain this result. Cobalt chloride is an example of such a chemical.

In the accompanying drawings:

FIG. 2 is an electrical diagram of the control circuit of the dryer;

FIG. 3 is an electrical diagram of the amplifier;

FIG. 4 is a modification of the sensing element shown in FIG. 1;

FIG. 5 is an electrical diagram of a modified circuit;

FIGS. 6, 7 and 8 are diagrammatic illustrations of further modifications therein.

Figure 1:
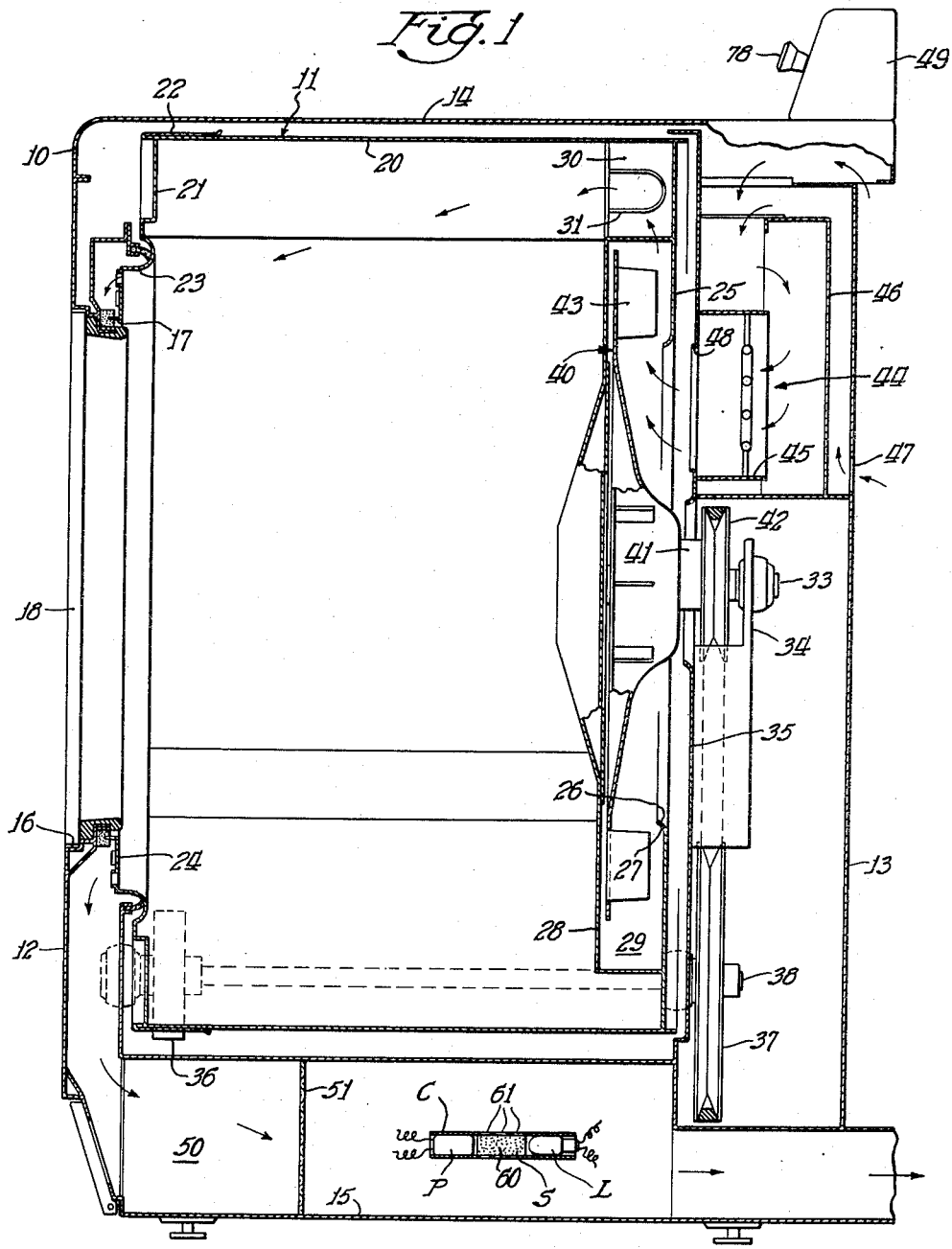
FIG. 1 is a cross-sectional view of a clothes dryer having incorporated therein the novel humidity sensing unit of the present invention.

Referring to the drawings and more particularly to FIG. 1, there is disclosed a clothes dryer of conventional form, with which the present control device may be associated. The dryer illustrated as an example, comprises an outer casing 10 in which is disposed a rotatable imperforate cylinder 11. The casing 10 comprises a front wall 12, a rear wall 13, a top wall 14, and a bottom wall 15. An opening 16 is provided in the front wall 12 and an opening 17 is provided in the cylinder 11 in registry therewith, whereby clothes may be inserted through the openings into the cylinder 11. A door 18 closes the opening 16.

The cylinder 11 comprises a metal shell 20 made of a solid, imperforate piece of metal, a forward drum end 21 suitably secured to the front end of the cylindrical shell 20 and a portion of which is bent over the cylindrical shell 20 to define a flange 22, and said front drum end 21 defining a curved ring 23 provided with a perforated flange 24 extending radially inwardly toward the axis of the cylindrical shell 20.

The rear drum end 25 has a central aperture 26 defined by an inturned flange 27, said rear end 25 having secured thereto a wall 28 projecting into the cylindrical shell 20 and adapted to define an annular chamber 29. An opening 30 is provided in the rear end 25 of the cylindrical shell 20, and a U-shaped wire 31 suitably covers this opening.

The rear end of the cylinder 11 is supported within the casing 10 by means of a shaft 33 rotatably secured to a bracket 34 and a supporting structure 35, and the front of the cylinder is supported by driving wheels or rolllers 36 engaging the flange 22 and adapted to be driven by pulleys 37 on shafts 38.

A fan 40 for the present dryer is mounted on a sleeve or hub 41 which is co-axial with the supporting shaft 33. A drive pulley 42 is attached to and drives the hub 41. The pulleys 37 and 42 are adapted to be driven by an electric motor M (FIG. 2). The fan 40 has a plurality of blades 43 in equally spaced relationship and disposed within the chamber 29.

A heater element 44 for the dryer is disposed in housing 45 formed of metal plates and providing a baffle 46. A plurality of apertures 47 are disposed in the rear wall 13 of the casing 10, and ambient air is drawn by the fan 40 through the apertures 47 in the direction indicated by the arrows over the heater element 44, through an opening 48 in the supporting structure 35, through the opening 26 and the opening 30 into the cylinder 11 and out through the perforated flange 24 and into an exhaust duct 50. A filter 51 is provided in the exhaust duct 50 and suitable access is provided through the casing wall for the insertion and removal of the filter.

The novel humidity sensing apparatus and its application to a clothes dryer, is shown in the electrical diagram seen in FIG. 2 and comprises basically a source of light consisting of a lamp L, a photo-electric cell P, a moisture sensing element S, an amplifier A, a timer T, the electric motor M, a heater H, and the electrical current lines L1 and L2 of a three-phase 220-volt circuit.

The lamp L, the photo-electric cell P, and the moisture sensing element S are placed in a tubular casing C located in the exhaust duct 50 of the dryer (see FIG. 1); the timer T is placed in a backguard 49; and the other electrical elements are appropriately placed at any convenient location in the dryer casing 10.

The sensing element S comprises a material which is color sensitive to changes in moisture. One suitable sensing material is loosely packed cotton 60 impregnated with any suitable chemical having the characteristics of being one color when wet and another shade or color when dry, or partially dry, such as an aqueous solution of cobalt chloride.

The impregnated cotton 60 is placed in the casing C between the lamp and photo-electric cell and is in air communication with the dryer exhaust air by means of a plurality of perforations 61 in the tubular casing C. The cobalt chloride-impregnated cotton, when wet, is transparent or partially transparent, and permits light rays from the lamp L to reach the photo-electric cell P. When the impregnated cotton dries, the cobalt chloride causes the cotton to turn blue and become partly opaque, thus decreasing the light rays from the lamp L to the cell P.

The photo-electric cell P, through the amplifier A, is adapted to operate and open a pair of normally closed timer motor controlling contacts 62 and 64 (FIG. 3). The timer motor in turn rotates a cam 65 having a high portion 66, an intermediate portion 67 and a low portion 68. The cam 65 is adapted to actuate a plurality of contacts 65a, 65b, 65c, 65d, 65e, and 65f.

The contact 65a is carried by a downwardly biased spring blade 70; the contacts 65b and 65c are carried by a downwardly biased spring blade 71; the contacts 65d and 65e are carried by a downwardly biased spring blade 72; and the contact 65f is carried by a downwardly biased spring blade 73. The blade 73 has a cam-contacting portion 74.

Stops 75 and 76 are provided for the blades 70 and 71, respectively, to limit the downward movement of these blades. A shaft 77 connects the timer motor with the cam 65 and a knob 78 is provided on the backguard for advancing the cam 65 to its high and starting position.

One terminal of the timer motor is connected to the line N and the other terminal is connected to the line L2; one terminal of the amplifier A is connected to the line N and the other terminal to the spring blade 70; one terminal of the heater H is the line L1, and the other terminal is the spring blade 71; one terminal of the motor M is the line N and the other terminal is the blade 72; and the terminal of the line L2 is the blade 73. A conventional safety switch 80 is provided in the heater circuit, and operated by the motor M, to assure that the heater will not be energized unless and until the motor M is operating.

The amplifier A, as seen in detail in FIG. 3, is of more or less conventional construction and comprises basically a triode type amplifier tube 90 which consists of a filament 91 for heating a cathode 92, a control grid 93, and an anode 93'. Also in the amplifier circuit is the relay 94 which actuates the contacts 62 and 64; a resistor 95; a variable resistor 96; and a transformer 97. The amplifier could equally well be pentode or a transistor, or if a power photo-cell is used no amplifier at all is required.

In operation, a load of wet clothes is placed in the cylinder 20 and the time knob 78 is rotated to move the cam 65 counterclockwise and move the blade 73 by the high portion 66 of the cam into a position making or closing all the contacts of the timer. The timer motor contacts 62 and 64 are normally closed and current is, therefore, supplied to all elements of the dryer, starting the dryer in its drying cycle.

At this time, the cotton 60 may be white or pink if room humidity is fifty percent or more, or may be blue if the air is dry from previous runs, and thus opaque due to the relative dryness of the initially exhausted air. Consequently, the plate current, supplied by the amplifier tube 90, is insufficient to energize the relay 94. However, as soon as the dryer has operated a few minutes, the heater will extract moisture from the wet clothes and the fan 40 will force this moisture-laden air into the outlet duct 50 where it comes in contact with the cotton 60.

The moisture changes the color of the cotton from blue to pink or white and the cotton, therefore, becomes transparent or semitranslucent. Sufficient light is now transmitted through the cotton to raise the plate current of the amplifier tube, to an amount sufficient to energize the relay 94 and open the timer motor contacts 62 and 64 stopping the timer cam 65 on its high portion 66.

The drying cycle continues with all elements energized, except the timer motor, until the moisture content of the exhausted air reaches a predetermined minimum, at which time the color of the cotton 60 changes to blue and is partly opaque and the plate current supplied by the amplifier tube is insufficient to hold the relay 94 energized.

Upon the deenergization of relay 94, the timer motor contacts 62 and 64 close, the timer is energized and proceeds to rotate the cam 65 to its intermediate portion 67. The cam contacting portion 74 of the blade 73 drops into the intermediate portion 67, causing the spring blades 70 and 71 to move downwardly against their stops and respectively break the amplifier contacts 65a and 65b thus deenergizing the amplifier A.

The spring blade 72 is also biased downwardly to break the heater contacts 65c and 65d to deenergize the heater H. The contacts 65e and 65f for the motor M remain closed and the motor M continues to drive the cylinder 11 and the fan 40 until the cam contacting portion 74 drops into the low portion 68 of the cam 65, at which time the contacts 65e and 65f are opened to stop the operation of the dryer. The purpose of the intermediate cam 67 is to provide a cool-off period for the dryer.

The amount of time on the high portion 66 of the cam 65 is selected to insure starting of the automatic operation of the dryer and must be of sufficient duration to prevent the cam-contacting portion 74 of the blade 73 from entering the intermediate portion 67 before the sensing element S causes automatic operation of the dryer. It is preferred to provide about five minutes on the portion 66 of the cam and another five minutes on the portion 67.

A simpler electrical circuit may be used by dispensing with the cool-off period. In such a case, the timer is not necessary and it is only necessary to provide means for starting the motor and heater. In FIG. 5, there is disclosed a simplified circuit wherein a dashpot 110 of conventional construction, and having a release time of about five minutes, is placed in the current circuit to the motor and heater.

In operation, the dashpot 110, in FIG. 5, is actuated to close the circuit and to start the motor M which, in turn, closes the switch 80 to energize the heater H. After a few minutes, but less than five, the sensing element S will become moist due to the exhausted moist air from the dryer and sufficient current will flow from the cell P to actuate the relay and close the relay-operated contacts. At the end of five minutes from the actuation of the dashpot 110, the dashpot-controlled switch will be opened.

The drying cycle will proceed until the sensing element S becomes sufficiently dry to change color and reduce the light to the photo-electric cell P, thereby reducing the current to the relay and causing the relay to become deenergized. At this time, the electrical circuit is broken to the motor M and heater H and these elements cease to operate, thus terminating the drying operation. It is also possible to dispense with the dashpot switch and have the dryer entirely under the control of the automatic device. In this case it might require two or three minutes after the wet load is placed in the dryer for the moisture to diffuse down to the sensing element before the machine starts.

The cotton 60 of the sensing element S may have substituted therefor other moisture sensing materials to operate the photo-electric cell P. For example, there is shown in FIG. 4 a modification of the sensing element wherein a piece of ordinary paper 100 treated with an aqueous solution of cobalt chloride, is placed between the lamp L and the cell P. It has been found that the paper will change color and have the same effect on light transmitted as the cotton 60.

It is also possible to use reflected light instead of transmitted light, if so desired. In this case, the lamp L and the photo-cell P are located on the same side of the treated paper 100, as shown in FIG. 6. In some cases, this would be advantageous since both the light and photo-cell can be outside the air duct with the treated paper being a part of the wall of the duct. These elements can be in a sealed chamber away from any lint and dirt. Lint on the treated paper will have no effect on its operation.

While an amplifier has been disclosed as part of the present control system, it is possible to dispense with an amplifier when a photo-cell of the type disclosed in U.S. Patent No. 2,654,819 is used as the photo-cell of the system.

The apparatus for sensing moisture conditions can be used in many other applications and is not to be considered as limited to the use described above.

Figure 7:
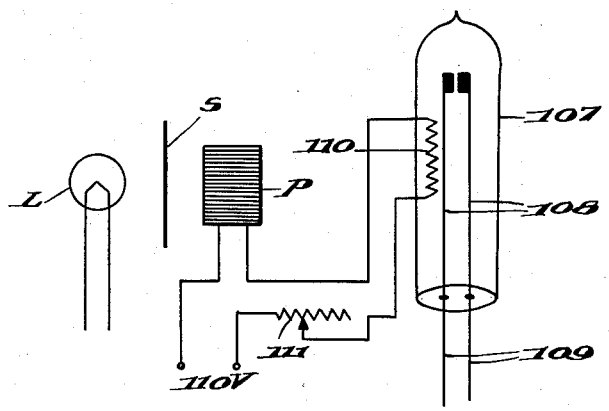
Figure 8:
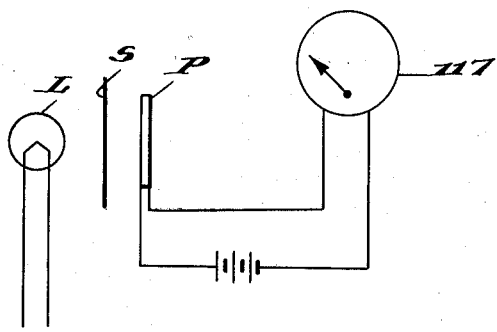

Moreover, other types of photo-electric controls may be used in connection therewith either for controlling electric circuits or indicating conditions, examples of which are illustrated in FIGS. 7 and 8 of the drawings.

Referring to FIG. 7, a source of light L is in position to direct light therefrom onto a light responsive device such, for example, as a large area photo-cell as described more in detail in my prior Patent No. 2,654,819, granted October 6, 1953. A moisture sensitive element S is interposed therebetween, which may be of any of the types described above and so related as to affect the light transmitted from the light source to the photo-cell according to the conditions of humidity present in sensitive element S. Thus, for example, a sheet of paper or fabric treated as described.

The light responsive element P is connected to a suitable relay, generally indicated at 107. In this instance, the relay 107 comprises an evacuated or gaseous tube containing therein bimetallic blades 108 carrying contacts in position for engagement with each other to close a circuit 109, which may be any suitable control circuit. The blades 108 are thermo-responsive by a resistance heater element 110 enclosed within the evacuated chamber. One side of the resistance heater 110 is shown as connected with one side of the photo-cell P and the other side of the resistance heater is connected to a suitable control device, such as a rheostat 111.

As light is controlled by moisture conditions onto the photo-cell P, this varies the current in the resistance heater 110 which opens or closes the contacts for the circuit 109. Any other type of switch can be substituted therefor, or snap-action connections can be used for controlling the circuit.

Instead of connecting the circuit with a relay or control switch, the photo-cell P can be connected in a circuit with a suitable indicator, such as a meter shown at 117 in FIG. 8. This will function as described above to indicate on the meter the amount of moisture in the atmosphere to which the moisture sensitive sheet S is subjected and thus be responsive thereto.

While I have described my invention in connection with certain specific embodiments thereof, it is to be understood that this is by way of illustration and not by way of limitation, and the scope of my invention is defined solely by the appended claims which should be construed as broadly as the prior art will permit.

I claim:

1. In a clothes dryer having a cylinder mounted for rotation and adapted to receive the clothes to be dried, a fan, an electrical circuit, a heater in said circuit, a motor in said circuit and operative to rotate said cylinder and said fan, and timer means in said circuit operating switch means for starting the operation of said heater and said motor, the improvement comprising means for connecting said timer means in the circuit to provide automatic operation of said dryer comprising means for sensing humidity conditions in said dryer, said last-named means including a light-responsive current flow device in said circuit, a light source in said circuit, a moisture absorbent material placed in responsive relation to said source of light and said light responsive device, said material being color sensitive to changes of moisture in the dryer to vary the intensity of light from said source to said light-responsive device, and means responsive to current in the light-responsive device to connect said timer means in accordance with the moisture content of the air in the dryer.

2. In apparatus for removing moisture from a material, means for supporting the material, passage means for conducting air through the material including an inlet portion and an outlet portion, means in the inlet portion for heating the air before it is conducted through the material, switch means for controlling the operation of the heating means, said switch means being manually operated for initiating operation of the heating means, timer means for operating the switch means to stop operation of the heating means and means for starting the timer means in response to a predetermined low amount of moisture in the outlet portion, said starting means comprising a light source, a light responsive device, a sheet of moisture absorbent material placed in reflecting relation to said light source and said light responsive device, said light source and light responsive device located outside the outlet portion, said absorbent material located in the outlet portion, and means for operatively connecting the light responsive device to the timer means.

3. In apparatus for removing moisture from a material, means for supporting the material, means for moving air through the material and exhausting it, means for heating the air before it is moved through the material, switch means for controlling the operation of the heating means, said switch means being manually operated for initiating operation of the heating means, timer means for operating said switch means after a predetermined period of time, and means for interrupting said timer means in response to an increase above a predetermined amount of moisture in the air which has moved through the material, said interrupting means including a light source, a light responsive device, and absorbent means between the light source and the light responsive device and in the path of the exhaust air for changing the light transmitted therebetween in response to a change in the moisture whereby the timer means is inoperative and the heating means is operative while the material is being dried.

4. In apparatus for removing moisture from a material, means for supporting the material, means for moving air through the material and exhausting it, means for heating the air before it is moved through the material, switch means for controlling the operation of the heating means, said switch means being manually operated for initiating operation of the heating means, timer means for operating the switch means to stop operation of the heating means and means for stopping and starting the timer means in response to predetermined amounts of high and low conditions of moisture in the air respectively which has moved through the material, said timer stopping and starting means comprising a light source, a light responsive device, absorbent means between the light source and the light responsive device and in the path of the exhaust air for changing the light transmitted therebetween in response to a change in the moisture in the air, and means operatively connecting the light responsive device to the timer means.

5. In apparatus for removing moisture from a material, means for supporting the material, means for moving air through the material and exhausting it, means for heating the air before it is moved through the material, switch means for controlling the operation of the heating means, said switch means being manually operated for initiating operation of the heating means, rotary cam means for operating the switch means to stop operation of the heating means, a timer motor, means forming a driving connection between the cam and the timer motor, and means for stopping and starting the timer means in response to predetermined amounts of high and low conditions of moisture in the air respectively which has moved through the material, said timer stopping and starting means comprising a light source, a light responsive device, absorbent means between the light source and the light responsive device and in the path of the exhaust air for changing the light transmitted therebetween in response to a change in the moisture in the air, and means operatively connecting the light responsive device to the timer means.

6. In apparatus for removing moisture from a material, means for supporting the material, means for moving air through the material and exhausting it, means for heating the air before it is moved through the material, switch means for controlling the operation of the heating means, said switch means being manually operated for initiating operation of the heating means, rotary cam means for operating the switch means to stop operation of the heating means, a timer motor, means forming a driving connection between the cam and the timer motor, and means for stopping and starting the timer means in response to predetermined amounts of high and low conditions of moisture in the air respectively which has moved through the material, said timer stopping and starting means comprising a light source, a light responsive device, absorbent means between the light source and the light responsive device and in the path of the exhaust air for changing the light transmitted therebetween in response to a change in the moisture in the air, a timer motor switch and means for opening and closing the timer motor switch in response to a predetermined high and low intensity respectively of transmitted light.

References Cited in the file of this patent

UNITED STATES PATENTS

| | | |
|---|---|---|
| 1,933,803 | Hickman | Nov. 7, 1933 |
| 2,109,235 | Kott | Feb. 22, 1938 |
| 2,403,630 | Blunk et al. | July 9, 1946 |
| 2,687,041 | Anderegg | Aug. 24, 1954 |
| 2,826,825 | Morrison | Mar. 18, 1956 |
| 2,744,337 | Raney | May 8, 1956 |